Dec. 16, 1941.    W. A. E. MITCHELL    2,266,234
FISHING BAIT
Filed April 6, 1939
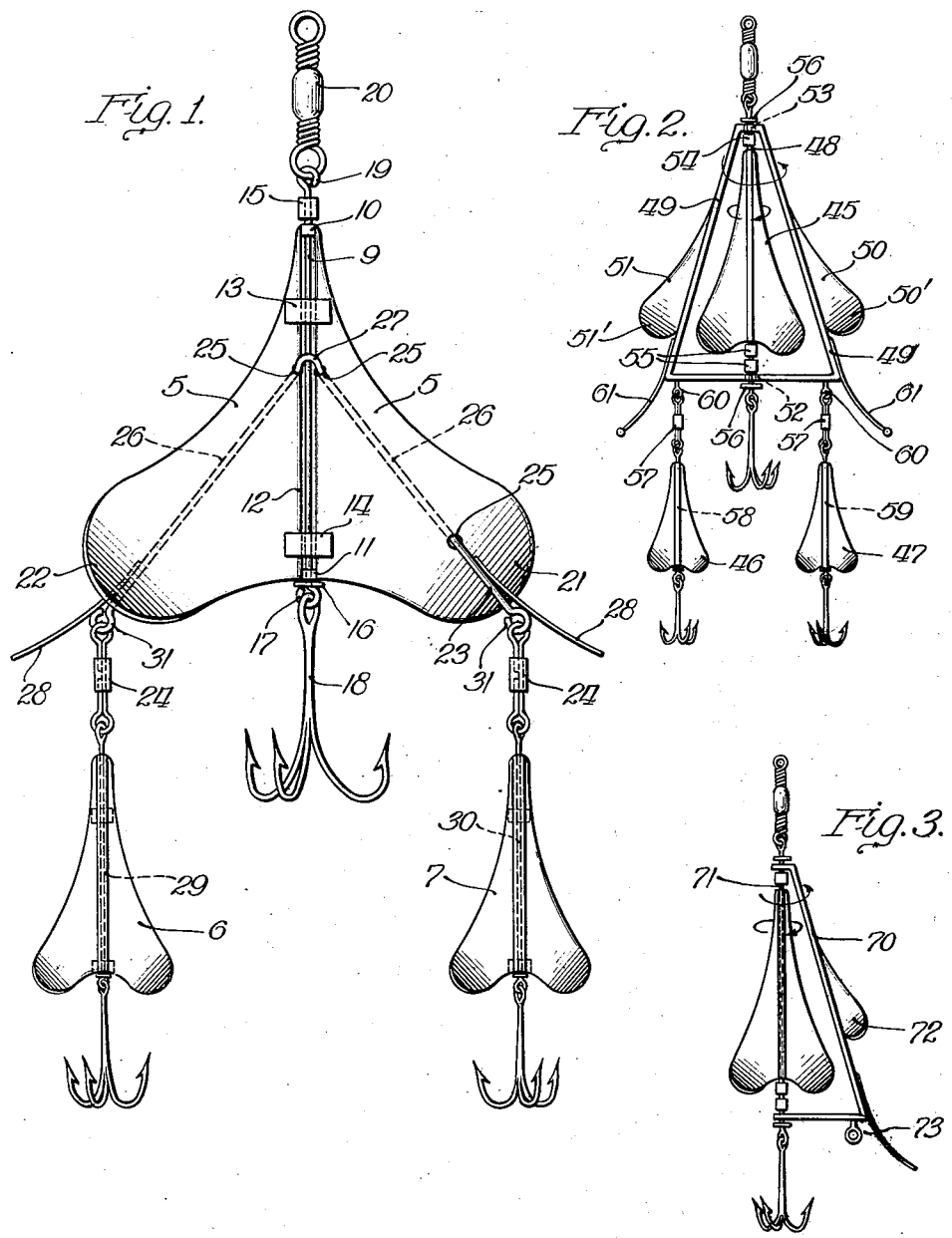
INVENTOR.
Wilbur A. E. Mitchell
BY Richardson and Auer
ATTORNEYS.

Patented Dec. 16, 1941

2,266,234

UNITED STATES PATENT OFFICE 2,266,234

FISHING BAIT

Wilbur A. E. Mitchell, Chicago, Ill., assignor of one-fourth to George Auer, Chicago, Ill.

Application April 6, 1939, Serial No. 266,242

9 Claims. (Cl. 43—45)

It is well known that spoons and spinners are desirable baits for universal use, either for small fresh water game fish, such as bass and lake trout, or for large fresh water game fish such as muskellunge, and the same holds true for much salt water game fishing. Most spoons and spinners are impractical, however, because they become easily snagged against logs and other underwater objects when drawn through the water, with the result that their action must necessarily be quite limited to overcome that objection, and their efficiency as a lure in attracting fish thus likewise limited.

The general object of the present invention is to produce a bait or lure that is relatively free from danger of snagging and at the same time is more animated and attractive to fish than lures now on the market.

An important object of this invention is to provide a bait comprising a plurality of spaced spinners or spoons adapted for movement of one about the other as drawn through the water.

Another object is to provide a bait or lure comprising a plurality of spinners or spoons all mounted for revolution upon a common axis such that as the line is drawn through the water one of the spinners also revolves upon another axis.

Another object is to provide a bait or lure comprising a plurality of spinners with connecting or supporting means acting as a guard to prevent snagging of the spinners upon submerged objects.

Further objects and advantages of this invention will be self-apparent from the following description and claims and from the accompanying drawing of some of the embodiments of my invention.

Fig. 1 is an elevation of a lure constructed according to this invention;

Fig. 2 is an elevation of another preferred embodiment of this invention;

Fig. 3 is an elevation of a similar lure constructed according to my invention.

Referring to the drawing, Fig. 1 comprises a lure or fish bait, consisting of three spinners 5, 6 and 7. Spinner 5 comprises nickel or copper blades or spoons mounted for revolution upon and about a shaft or longitudinal axis 9 by being soldered to bearings 10 and 11 loosely fitted upon shaft 9. The spinner 5 has an opening or channel 12 longitudinal thereof, of such size that its inside edges do not contact shaft 9, the mounting on the shaft being accomplished through the medium of bearings 10 and 11. Auxiliary bent plates 13 and 14 are soldered onto the spoons or blades 5 across the channel 12, but clear of the shaft 9, to assure that the blades 5 do not become detached from the shaft 9, should the spinner become loosened from its bearing members 10 and 11. These plates may be in the form of simple members with the center somewhat raised and flat ears extending therefrom for attachment to the spoons or blades 5. 15 is an idle loosely fitted collar upon the shaft 9, and 16 is a loosely fitted washer upon that shaft resting against eyelet 17 formed at the bottom of shaft 9, to which is attached a treble fish hook 18. The other or upper end of shaft 9 is formed into an eyelet 19 to which is attached a conventional barrel swivel member 20.

The outer tips of the spinner 5 are bent at 21 and 22 into wings to form the blade into a propeller shape, the end 21 being bent downwardly and the end 22 being bent upwardly, as illustrated, thereby causing the spinner 5 to rotatably spin upon the shaft 9, as its axis, as it is drawn through the water.

Spinners 6 and 7 are of similar construction to the spinner 5, and are detachably connected in the position as illustrated with the spinner 5, by means of wishbone member 23 and conventional slide clasp fasteners 24. Wishbone member 23 does not follow the curvature of wings 21 and 22 but extends straight out from the straight portions of the blades of the spinner 5. The wishbone member 23 is shown as laced through the blades at holes 25, and around and clear of the shaft 9 at 27, and extends flush with the flat, straight portions of the blades at 26 and is soldered along and to the flat portion of the blades. This connection or wishbone member 23 is designed to carry the stress of a heavy fish, which might be caught upon one of the spinners 6 or 7, to the center shaft 9 without damaging the spinner 5 or wings 21 and 22.

Wires 28 are soldered to the wishbone 23 as illustrated, so as to project a suitable distance, in the manner illustrated, thus acting as a guard to protect spinners 6 and 7 from becoming fouled or snagged by underwater objects, such as stones and logs.

It will thus be readily seen that the embodiment of my invention illustrated in Fig. 1 presents a bait ideal for deep sea and lake trout fishing as well as shallow water fishing. This presents a highly animated lure as drawn through the water. The force of the water against the wings 21 and 22 of the spinner 5 causes it to positively revolve upon its axis 9, carrying with it the spinners 6 and 7 in planetary formation. As the spinner 5 is drawn through the water and revolves upon its axis 9, each of the spinners 6 and 7 will at the same time revolve upon its individual axis, and at the same time each spinner 6 or 7 revolves because of its connection through 23, 24 around the axis 9 of the spinner 5.

It will be desirable at times, according to weather and water conditions when fishing, to disconnect either or both of spinners 6 and 7 from spinner 5 by operation of the conventional slide clasp fasteners 24, and instead fasten plain hooks, a pork rind, or feather lure, or any other desired bait, live or artificial, at the eyelets 31 at the protruding ends of the wishbone member 23. When plain hooks, such as treble hooks, are fastened at the eyelets 31, a novel bait is to be noted, which in use presents a plurality of hooks, one or more rotating around the other in a transverse plane to the axis of rotation. Instead of the spinners 6 and 7, ordinarily treble or other conventional plain hooks can be fastened onto eyelets 31 and the spinner 5 used in that manner, for trolling.

Fig. 2 presents another embodiment of this invention constructed in a similar manner to that shown in Fig. 1, but for the connecting means between the spinners. In Fig. 2, spinner 45 of chromium or copper is mounted for revolution, similar to spinner 5 of Fig. 1, upon its shaft or axis 48. Likewise, spinners 46 and 47 are each mounted for revolution upon the axis of each, being 58 and 59, respectively. Instead of the spinners 46 and 47 being carried through the forward spinner blade in their connection with the forward axis, as shown in Fig. 1, in Fig. 2 they are connected with the forward axis 48 by means of a separate triangular shaped bracket member 49 also pivotally mounted upon the axis 48 by means of loose aperture bearings at 52 and 53. Collars 54 and 55 and washer 56 loosely mounted upon the shaft 48 act as bearings and as spacing members on shaft 48 between the spinner 45 and the bracket member 49 so that spinner 45 and bracket 49 are free to turn or revolve upon the shaft 48 without interference or contact with the other. Fins or spoons 50 and 51, somewhat pear-shaped, gold plated or of chromium, preferably, are soldered onto the exterior edge of the bracket member 49, so as to protrude therefrom. The lower tip of spoon 50 is bent upwardly at 50', and the lower tip of spoon 51 is bent downwardly at 51', so that the two spoons 50 and 51 act as propeller blades for revolution of the bracket 49 upon the axis 48 as the bait is drawn through the water.

As illustrated, the spinner 45 revolves clockwise upon axis 48 as drawn through the water, and the spinner means 49, 50 and 51 independently revolves counter clockwise upon axis 48 as the bait is drawn through the water. The spinner connecting means 49, 50 and 51 carry the two trail spinners 46 and 47 by means of eyelets 60 protruding rearwardly from the bracket 49, as illustrated, through detachable slide clasp connecting means 57. Therefore, as the spinner means 49, 50 and 51 revolves on axis 48, it carries with it the two trail spinners 46 and 47 also around the axis, and the spinners 46 and 47 revolve upon their respective axes 58 and 59 as the bait is drawn through the water. At the same time the spinner 45 revolves upon axis 48 within the bracket 49, idling independently thereof.

This is a bait which is very effectual for deep water trolling for such fish as muskellunge and lake trout in the hot summer months, when lots of animation, color and commotion are needed to arouse them in the darkness of 50 to 150 feet of water. The spinner 45, for example, can be of silver or chromium; the spoons 50 and 51 may be gold plated; and the spinners 46 and 47 may be of copper.

The center spinner 45 will revolve at a different rate of speed as the bait is drawn through the water than spinners 46 and 47, because the side revolution upon the axis 48 will retard the revolution of 46 and 47 upon their respective axes. Then in turn the spoons 50 and 51 and bracket 49 revolving upon axis 48 act as a spinner means independently of the others and will obviously revolve at a third rate of speed. This combination of spinners is novel further in that the spinner bracket 49 acts as a guard means protecting the inside spinner 45 as the bait is used, and also to a certain extent protects the trailing spinners 46 and 47. Wires 61 are also provided to further act as a guard means toward that end. Hooks can be fastened at the eyelets 60 instead of the spinners illustrated, thus producing another novel bait which when drawn through the water presents a plurality of hooks, one rotating around the other as a center in a transverse plane to the axis of rotation. Obviously, the bait illustrated in Fig. 2 without the trailing spinners 46 and 47, by disconnecting them through the use of means 57, makes a very practical novel bait, with or without anything being connected in their stead at eyelets 60. The use of pork rind, or feathers or treble hooks in lieu of rear spinners 46 and 47 at 60 by means of 57 makes a practical and novel bait.

Fig. 3 presents a similar embodiment of this invention to that illustrated in Fig. 2. The bait illustrated in Fig. 3 has a D-shaped bracket 70 pivotally mounted on the shaft 71 with only one spoon 72. This modification is illustrated as one adapted for casting, as well as for fly rod use in restricted quarters. The structure, operation, and use of this lure can be fully understood by reference to the prior explanation relative to Fig. 2. A feather or pork rind is recommended for attachment at 73, although a spinner and hook can be used.

It is, of course, understood that various changes and modifications may be made in the details of construction and design of the above illustrated and described embodiments of this invention, and in the combination and arrangement of the various parts without departing from the spirit thereof, such changes and modifications being restricted only by the scope of the accompanying claims.

What I claim is:

1. In a fishing lure, a fish hook, a rod or wire to which said hook is attached, a spinner having a central opening spaced from said rod rotatably mounted on said rod, two additional fish hooks, and means for securing said last mentioned hooks to said spinner near the extremities of the lower end thereof.

2. In a fishing lure, a rod or wire adapted for attachment to a line, a triangular frame rotatable on said rod, blades attached to said frame to cause rotation thereof, a spinner rotatable on said rod within said frame, hooks attached to said frame, and individual spinners associated with said hooks.

3. A fishing lure as claimed in claim 2, characterized by the provision of a hook supported directly in the rear of the spinner which rotates within the frame.

4. In a fishing lure, a fish hook, a rod or wire to which said hook is attached, a spinner rotatably mounted on said rod, a frame rotatably mounted on said rod, means for rotating said frame, and a fish hook attached to said frame at a point remote from its rotation axis.

5. A fishing lure as claimed in claim 4, characterized by the provision of a spinner associated with the hook which is attached to the frame.

6. A fishing lure as claimed in claim 4, in which the spinner and frame rotate in opposite directions.

7. A fishing lure as claimed in claim 4, in which the spinner and frame rotate at different speeds.

8. In a fishing bait, a spinner having a central opening and a plurality of blades laterally extending therefrom, a rod, and bearing members for rotatably mounting said spinner on said rod.

9. The structure defined in claim 8, together with a second spinner rotatably mounted on said rod within said opening of the first spinner.

WILBUR A. E. MITCHELL.